(12) United States Patent
Visser et al.

(10) Patent No.: US 10,944,266 B2
(45) Date of Patent: Mar. 9, 2021

(54) SYSTEM AND METHOD TO SUPPRESS GRID FREQUENCY DEVIATIONS

(71) Applicant: S4 ENERGY B.V., BM Rotterdam (NL)

(72) Inventors: Leendert Visser, CK Rotterdam (NL); Johannes Cornelis Klunder, MZ Westervoort (NL)

(73) Assignee: S4 ENERGY B.V., Rotterdam (NL)

(*) Notice: Subject to any disclaimer, the term of this patent is extended or adjusted under 35 U.S.C. 154(b) by 125 days.

(21) Appl. No.: 16/077,077

(22) PCT Filed: Feb. 9, 2017

(86) PCT No.: PCT/NL2017/050078
§ 371 (c)(1),
(2) Date: Aug. 10, 2018

(87) PCT Pub. No.: WO2017/138811
PCT Pub. Date: Aug. 17, 2017

(65) Prior Publication Data
US 2019/0044337 A1    Feb. 7, 2019

(30) Foreign Application Priority Data
Feb. 11, 2016   (NL) .................................... 2016251

(51) Int. Cl.
*H02J 3/32*   (2006.01)
*H02J 3/00*   (2006.01)
(Continued)

(52) U.S. Cl.
CPC ................. *H02J 3/32* (2013.01); *G05B 9/02* (2013.01); *H02J 3/00* (2013.01); *H02J 3/30* (2013.01); *H02J 7/0068* (2013.01)

(58) Field of Classification Search
CPC .... H02J 3/32; H02J 3/00; H02J 7/0068; H02J 3/30; H02J 2203/20; G05B 9/02
See application file for complete search history.

(56) References Cited

U.S. PATENT DOCUMENTS

| 5,659,593 A * | 8/1997 | Tzvieli .................... H04M 3/22 370/244 |
| 6,278,380 B1 * | 8/2001 | Minamisawa ......... G08G 1/042 324/226 |

(Continued)

FOREIGN PATENT DOCUMENTS

| WO | 2009012399 A2 | 1/2009 |
| WO | 2014121794 A1 | 8/2014 |

OTHER PUBLICATIONS

PCT International Search Report and Written Opinion from PCT/NL2017/050078, dated May 11, 2017, 15 pages.
(Continued)

*Primary Examiner* — Carlos R Ortiz Rodriguez
(74) *Attorney, Agent, or Firm* — Kacvinsky Daisak Bluni PLLC

(57) ABSTRACT

A method of suppressing frequency deviations in a power grid relative to a desired frequency behaviour, in particular at hour crossings, wherein an energy storage is connected to the grid, includes: monitoring frequency in the grid relative to the desired frequency behaviour, to determine detected frequency deviations; comparing detected frequency deviations with a threshold; if detected frequency deviations exceed the threshold, deploying the storage to charge therein energy from the grid or to discharge energy therefrom into the grid; and setting a variable threshold. A corresponding system includes: a connection to a power grid; an energy storage selectively connectable to the connection; a frequency monitor connected to the connection; and a control (Continued)

to configured to selectively deploy the energy storage in accordance with the method.

23 Claims, 18 Drawing Sheets

(51) Int. Cl.
  *G05B 9/02* (2006.01)
  *H02J 3/30* (2006.01)
  *H02J 7/00* (2006.01)

(56) References Cited

U.S. PATENT DOCUMENTS

| | | | | |
|---|---|---|---|---|
| 2007/0198133 | A1* | 8/2007 | Hirst | H02J 3/14 700/295 |
| 2008/0140327 | A1* | 6/2008 | Anklam | H02J 3/01 702/60 |
| 2013/0006431 | A1* | 1/2013 | Marroyo Palomo | G06Q 10/06 700/287 |
| 2013/0035802 | A1* | 2/2013 | Khaitan | H02J 3/32 700/297 |
| 2014/0052308 | A1 | 2/2014 | Hanafusa | |
| 2014/0097683 | A1 | 4/2014 | Piyabongkarn | |
| 2014/0214223 | A1* | 7/2014 | Tsunoda | H02J 3/381 700/292 |
| 2014/0292080 | A1* | 10/2014 | Markowz | H02J 3/24 307/18 |
| 2017/0155253 | A1* | 6/2017 | Veda | H02J 3/008 |

OTHER PUBLICATIONS

PCT International Preliminary Report on Patentability from PCT/NL2017/050078, dated May 3, 2018, 5 pages.
PCT Second Written Opinion from PCT/NL2017/050078 dated Feb. 2, 2018, 4 pages.

\* cited by examiner

| COMPARISON | FLYWHEEL | Battery System 1 (Lead Acid) | Battery System 2 (Li-ion) |
|---|---|---|---|
| Power (MW) | 24 | 24 | 24 |
| Energy (MWh) | 1.44 | 24 | 24 |
| DoD in operation | 100% | 10% | 10% |
| Number of full cycles per year | 4.500 | 450 | 450 |
| Life time Expectancy | 20 years | 3.5 years | 17.2 years |
| Total investment + OPEX over 20 years | € 22.300.000 | € 41.225.000 | € 48.400.000 |

FIG. 12 a: proportional deployment
b: deployment stopped by depleted storage, short pulses when storage space is available
c: required power is greater that max power storage

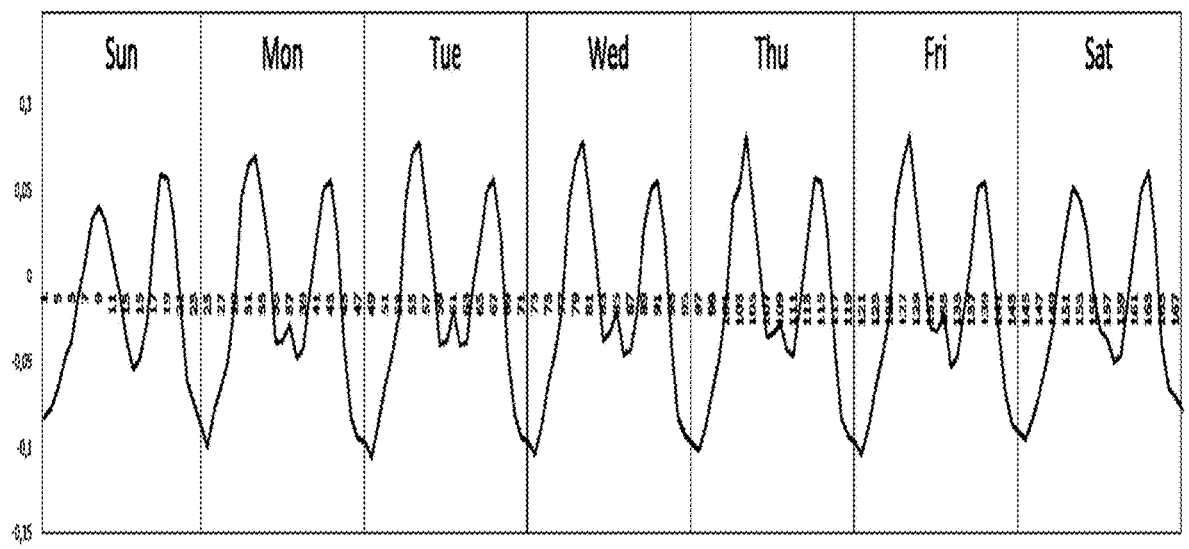
Analysis of peak height averaged over 10 months, per hour per day of the week
FIG. 18
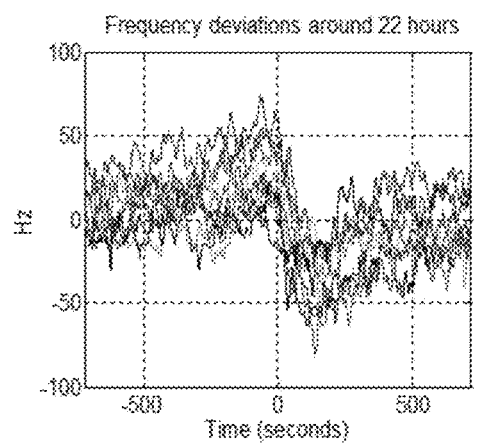
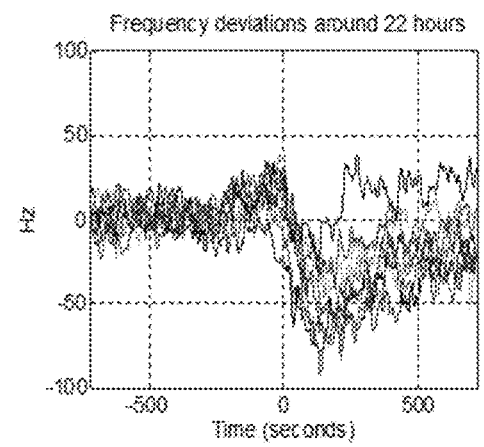
FIG. 19  FIG. 20

SYSTEM AND METHOD TO SUPPRESS GRID FREQUENCY DEVIATIONS

This is a national stage application filed under 35 U.S.C. § 371 of pending international application PCT/NL2017/050078, filed Feb. 9, 2017, which claims priority to Netherlands Patent application NL 2016251, filed Feb. 11, 2016, the entirety of which applications are incorporated by reference herein.

The present disclosure relates to a method and a system, configured to suppress frequency deviations in a power grid relative to a desired frequency behaviour, in particular at hour crossings. Normally a stable frequency behaviour at 50 or 60 Hz, or any other value, is very important. Frequency deviations are associated with imbalances between supply and load of the grid.

A power grid may extend across national borders, and normally comprises power lines, power supply and a beforehand unknown load. The supply may comprise normally a plurality of energy generating facilities, such as very stable and predictable coal or other fossil fuel burning electricity generating facilities and/or nuclear facilities, but also at least somewhat more spurious renewable electricity generating facilities, such as wind, wave and solar power facilities. Other electricity providing facilities can also be comprised. The power supply facilities may be exploited by power suppliers. The load is defined by the amount of energy consumed or received by power consumers or end users in homes, factories, businesses and the like.

It is known in the art and acknowledged here that imbalances may occur between supply and load power.

It is noted that the demand side of the load is somewhat unpredictable, and is moreover mostly impossible to control. Moreover, renewable energy generating facilities are more prone to unpredictable fluctuations, for example an unexpected wind calm, clouds before the sun, et cetera. These and other influences may cause imbalances between supply and load, leading to frequency fluctuations. Further, power suppliers provide predictions and have agreements about energy supply to the grid which predictions and agreements are often based on hour block based power supply, in which the suppliers furnish predetermined or predicted amounts of energy. At hour crossings, frequency deviations are caused or aggravated by power supply handovers between suppliers.

In the prior art grid, these "normal" operating circumstances and other more grave emergencies (like an electricity generating facility being disconnected from the grid) may all occur and cause frequency deviations resulting from imbalances between supply and load. It is known in the art and acknowledged here that primary and secondary controls are in place, connected to the grid. These are designed to combat true emergencies and resulting frequency deviations, using power/energy reserves in a delayed, proportional manner. This is to say that the response of the primary controls (also referred to as FCR or PCR) and secondary controls (also referred to as FRR or SCR) exhibit a response which is proportional to a particular frequency deviation at any given time, at a delay from the moment at which such a frequency deviation is detectable.

It is further known in the art and acknowledged here that the primary and secondary controls are constantly misappropriated and used to address normal operational frequency deviations at imbalance caused by spurious sources, spurious loads and at hour crossings.

However, these primary and secondary controls are designed and intended for the more grave and true emergencies, such as the drop out of an energy generating facility.

Repetitive or even practically constant deployment of the primary and secondary controls in normal operations or even only at hour crossings may cause the primary and secondary controls to be overly used, as a consequence of which the primary and secondary controls may fail in case of a true emergency, which may present a potential threat to stability of the grid, in particular in case of such a grave and true emergency. However, continued reliable functioning of the primary and secondary controls may already become impaired over time to the extent that the effectiveness thereof to decrease frequency deviations in normal operation or even only at many or all hour crossings may reduce as a consequence of excessive deployment of the primary and secondary controls.

The inventors of the present disclosure acknowledge that it has been proposed in the past to use energy storage, such as flywheels and/or batteries, to absorb energy from or release energy into the grid and thereby decrease frequency deviations. In particular WO-2014/121794 discloses power generation using wind turbines and supply to a grid with a storage of flywheels or batteries to continuously dampen grid frequency deviations relative to a maximum. Therein the storage is constantly deployed, to also equalize turbine output for supply to the grid. However, in as far as this can be ascertained, such energy storage in for example batteries and flywheels appears to have been contemplated only in the framework of conventional primary or secondary controls, exhibiting a fixed time delay and proportional response. According to the present disclosure, a varying threshold is set, depending on system parameters that may be dependent on time-of-day, or other considerations, to optimise the method. Therein, for example, a df threshold is determined. When the frequency crosses the threshold value, storage is deployed to counteract proportionally to the deviation in order to suppress the frequency deviation. Below the df threshold the algorithm may prepare the storage for the next up or down peak by charging (or discharging) its capacity, preferably to a 50% level. This way the storage can react on both positive or negative df peaks. The rate at which the (dis)charging takes place may also be set.

In principle, the threshold value can be dynamically adapted in this manner, for instance depending on the hour of the day. Statistics have shown that the largest peaks always occur on the same hour of the day. At these moments the threshold value can be set to 50 mHz or higher. At other moments during the day the threshold value may be lowered to 20 or 30 mHz. Thus a variable adaptation of the threshold value may correlate with the severity of anticipated peaks, and/or with available storage capacity needed for suppression of practically all peaks under the threshold (or at least practically all peaks, for example 80% of all such peaks), and/or with availability of primary control, et cetera.

Results of simulations and tests have yielded—for a storage configuration of 600 MW/36 MWh—a reduction of df peaks of 20.7% and throughout the simulated day of 9.0% (average hourly improvement). Moreover, using this algorithm, deployed Primary Control power is reduced by 29%. [More in particular, in an exemplary situation, deployed PCR without added storage controlled on the basis of the threshold can be 1544 MW, but deployed PCR with storage controlled based on threshold is anticipated to be 1096 MW; a reduction 448 MW].

Evidently, the variable threshold also proves to have benefits in other contexts than hour crossings.

The principles in the present disclosure have been developed to address and alleviate or even mitigate the disadvantages of prior art technology, and at least alleviate or even obviate the misuse of the primary and secondary controls to address imbalances and associated frequency deviations in what may be considered as normal operation.

To this end the assemblies of features in the appended independent method and system claims are provided.

The present disclosure also relates to a multitude of preferred embodiments within the framework defined in the appended independent method and system claims. Furthermore, many preferred embodiments will be discussed in the below embodiment description, referring to the appended embodiment drawings, where no aspect of the embodiments is to have a limiting effect on the scope of protection of the appended independent method and system claims. In the embodiment description and drawings, the same or similar reference signs may be employed for the same or similar features of preferred embodiments. In the drawings, FIG. 1 shows a graph of frequency deviations in an arbitrary time period, FIG. 2 shows a simplified exemplary embodiment of a system according to the present disclosure;

FIGS. 3 and 4 exhibit a statistical analysis of power peaks in frequency behaviour on a grid;

FIGS. 5 and 6 exemplify maximum amounts of energy needed to suppress frequency deviations;

FIG. 7 exemplifies big energy requirements for suppression of frequency deviations;

FIGS. 8 and 9 exhibit an analysis of peak coverage;

FIG. 10 exhibits an example of an hourly adjusted threshold;

FIG. 11 shows the effect of the scheme of FIG. 10 on deployment of primary control (PCR), at a single hour crossing;

FIG. 12 exhibits a table comparing flywheel configurations with exemplary battery based configurations;

FIG. 13 exhibits an example of a flywheel based configuration;

FIG. 14 exhibits results of testing the proportional algorithm;

FIG. 15 exemplifies test results for the static threshold level based algorithm;

FIG. 16 exhibits df/dt distilled from frequency deviations at a particular hour crossing;

FIG. 18 shows the average week pattern of an entire exemplary dataset of 10 months;

FIG. 19 shows that by grouping the frequency profiles by 'hour', peak heights (and direction) having similar values per hour are detectable;

FIG. 20 shows even more clearly similarities in height and direction as a result of compensating the base frequency level just before the hourly crossing;

Figure 21:
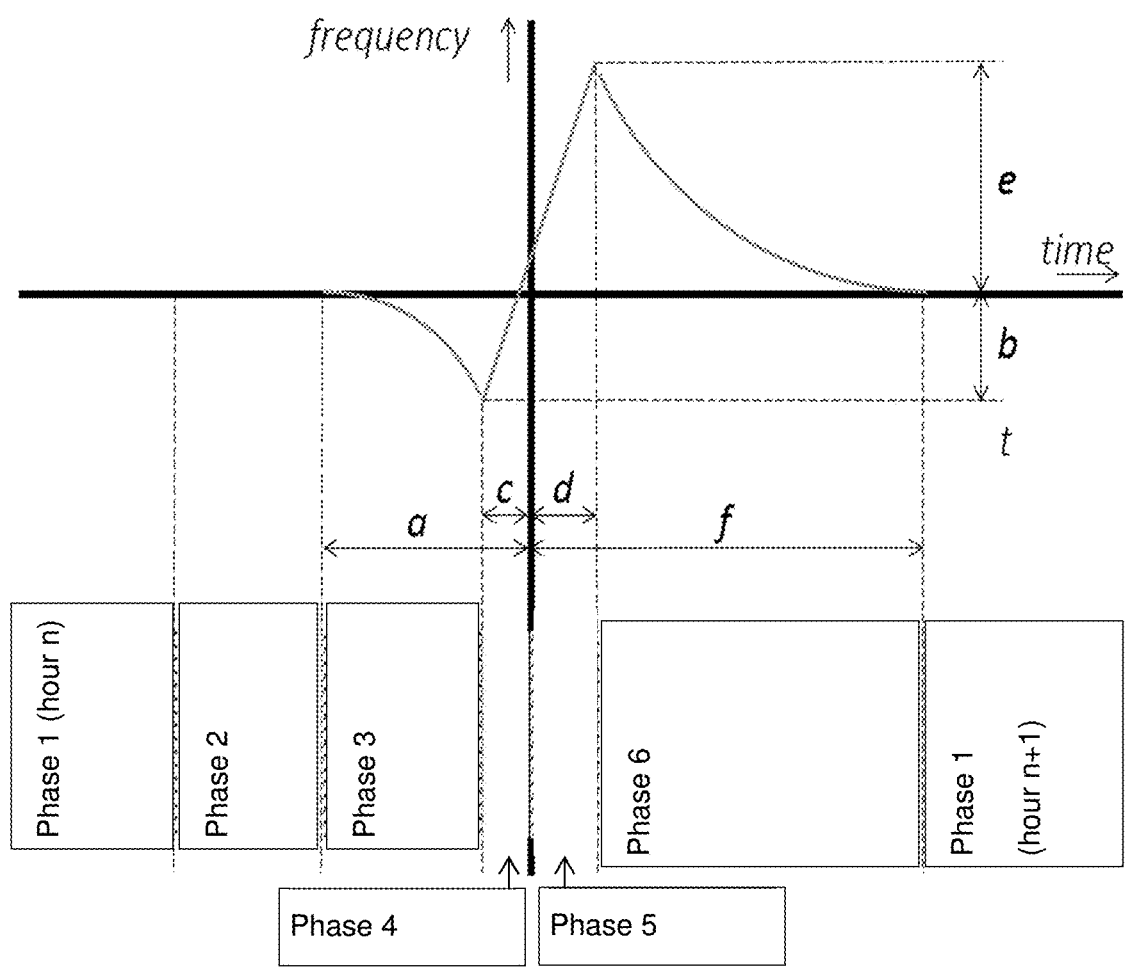
FIG. 21 shows a characteristic shape of an hourly crossing.
Figure 22:
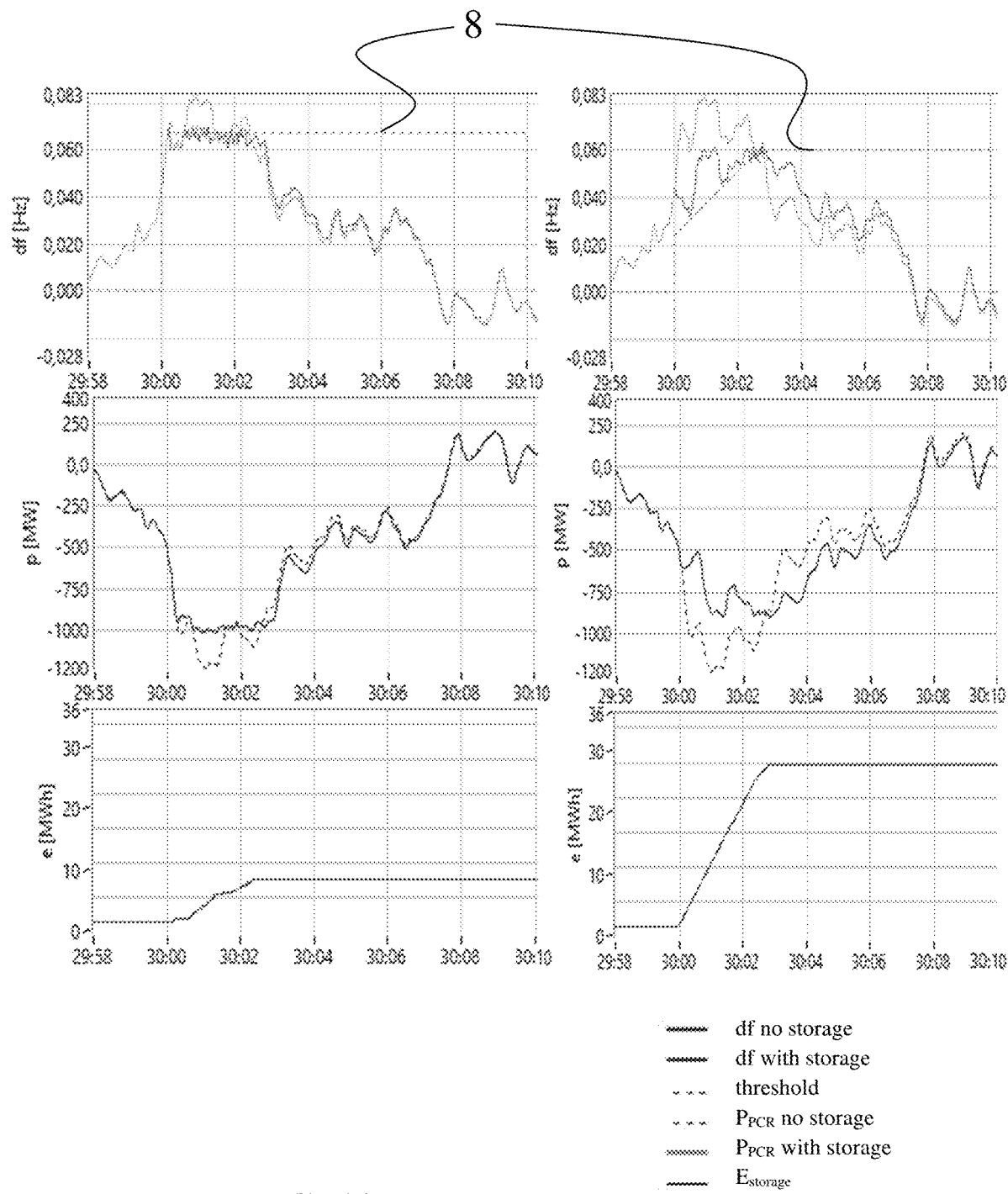
Figure 23:
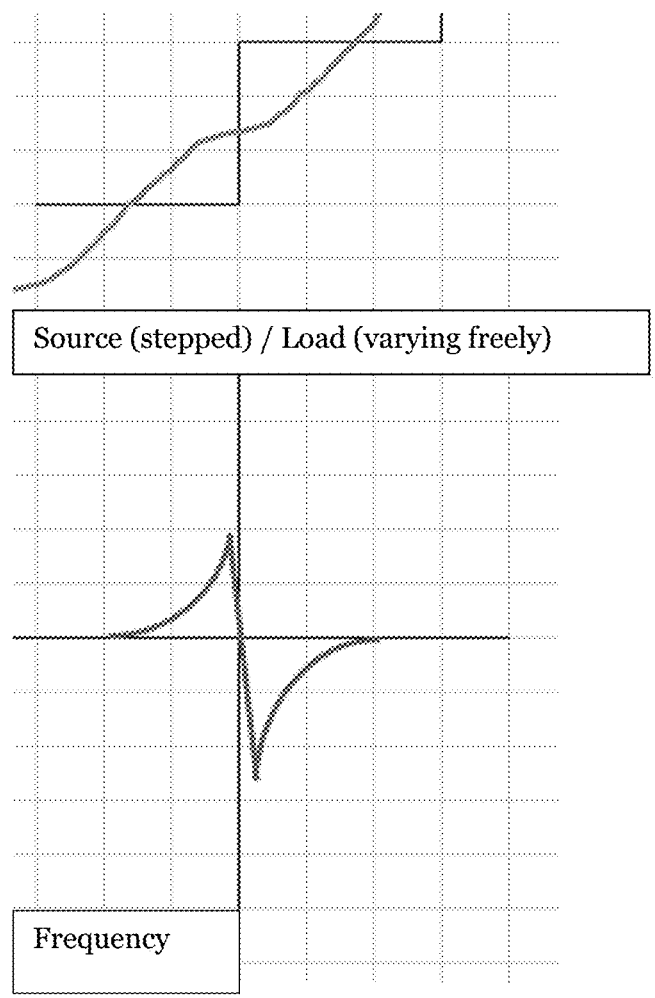
Figure 24:
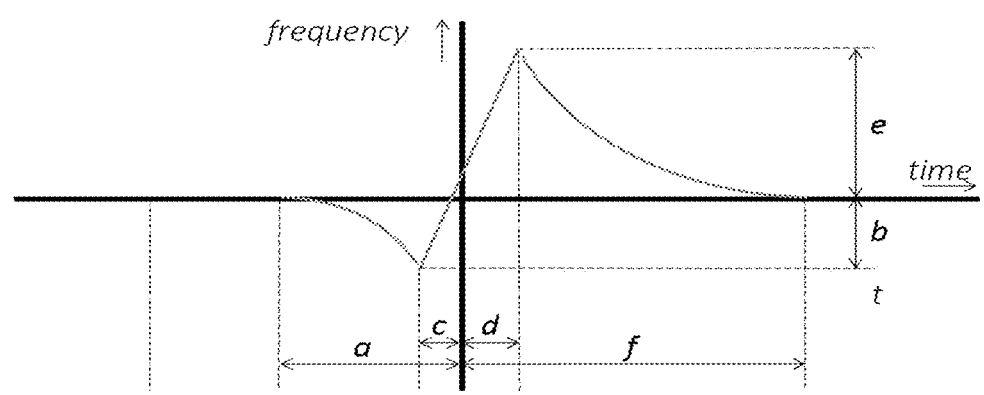
Figure 25:
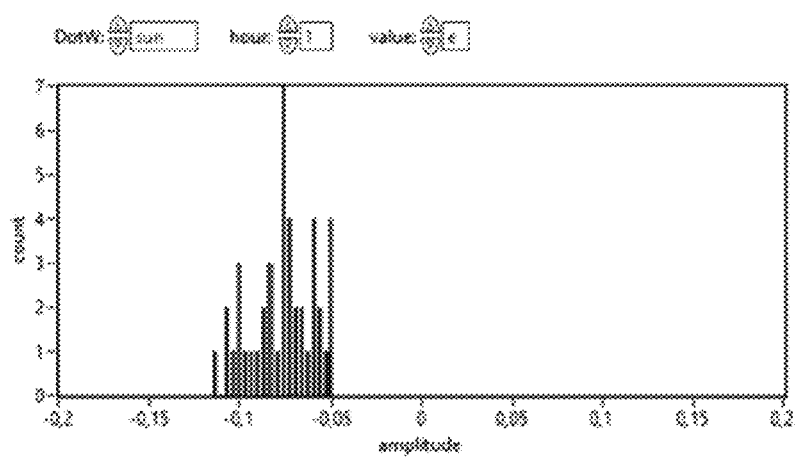
Figure 26:
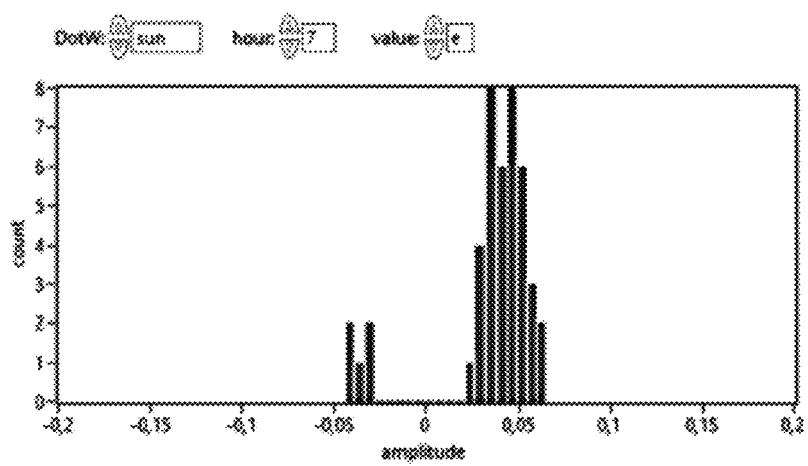
Figure 27:
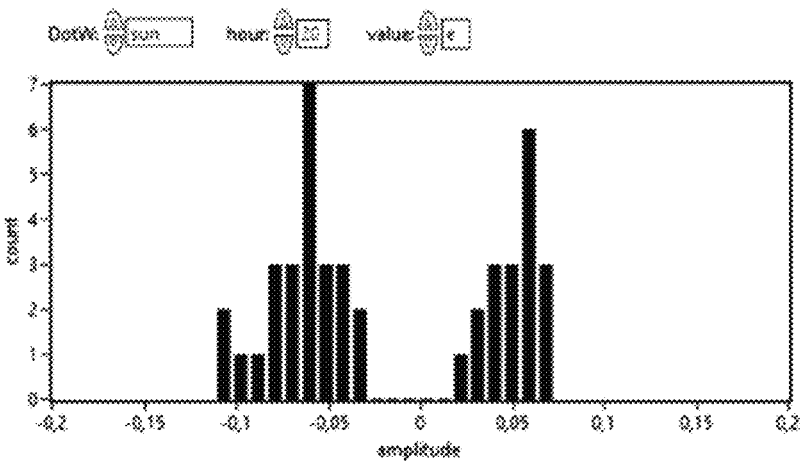
Figure 28:
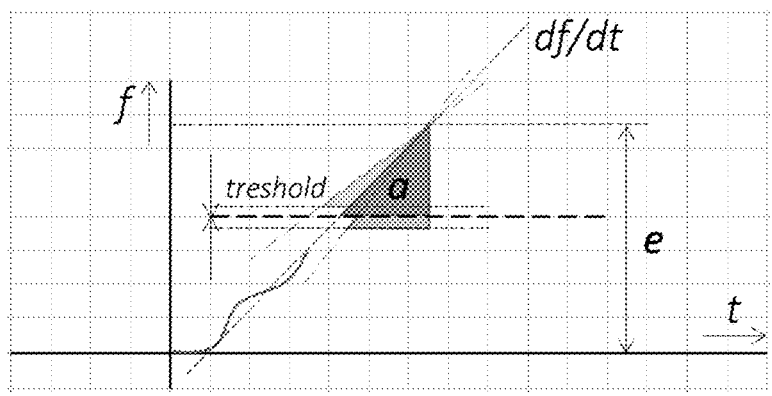
Figure 29:
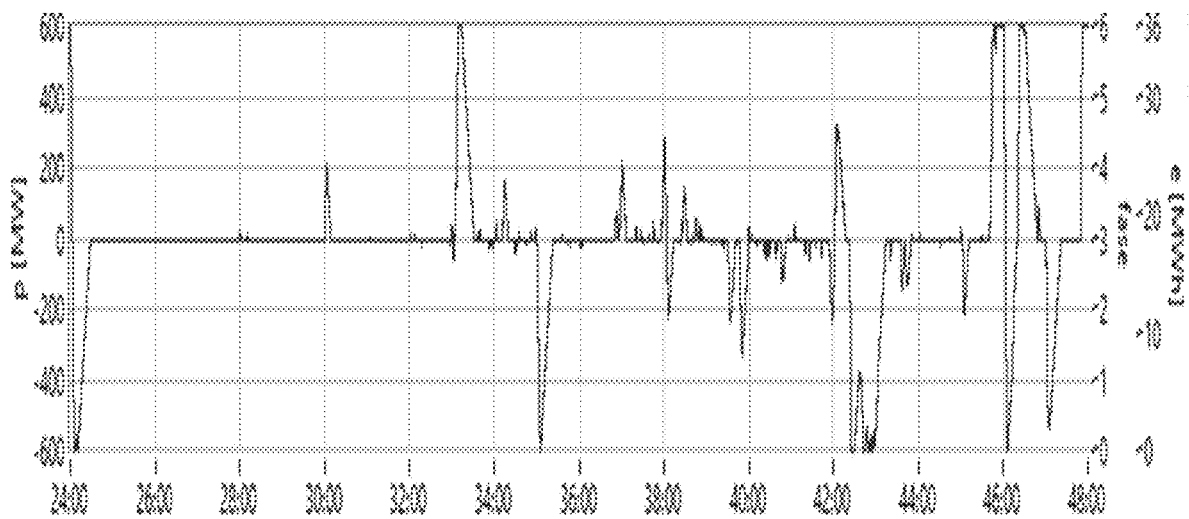
Figure 30:
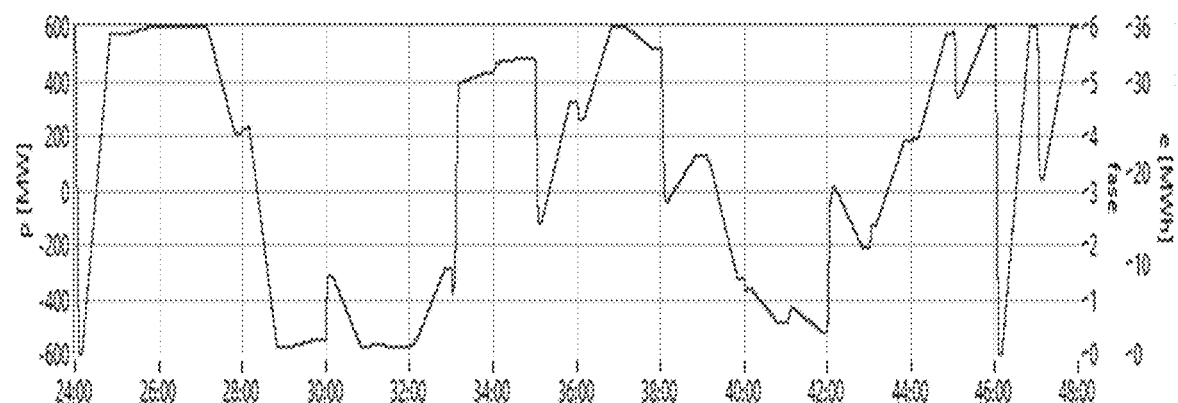

FIG. 22, on the right, shows the effect of the dynamic threshold function;

FIG. 23 shows balance between the gradual variation in energy consumption and the stepwise adaption of the energy generation and import mixes;

FIG. 24 also shows a generic shape of frequency behaviour at an hour crossing, just like FIG. 21;

FIG. 25 exhibits a first example of an approach to an hourly crossing, in which all observations are negative;

FIG. 26 exhibits a second example of an hour crossing, in which observations are for the most part in the positive area; a small part is in the negative area;

FIG. 27 exhibits yet another situation in which the observations are evenly distributed;

FIG. 28 exhibits measurements on the frequency slope immediately after the full hour;

FIG. 29 shows an embodiment in which no load management (no dynamic adaptation of the threshold) is applied; and FIG. 30 exhibits optimal preparation of the load level, through dynamic adaptation of the threshold.

Figure 1:
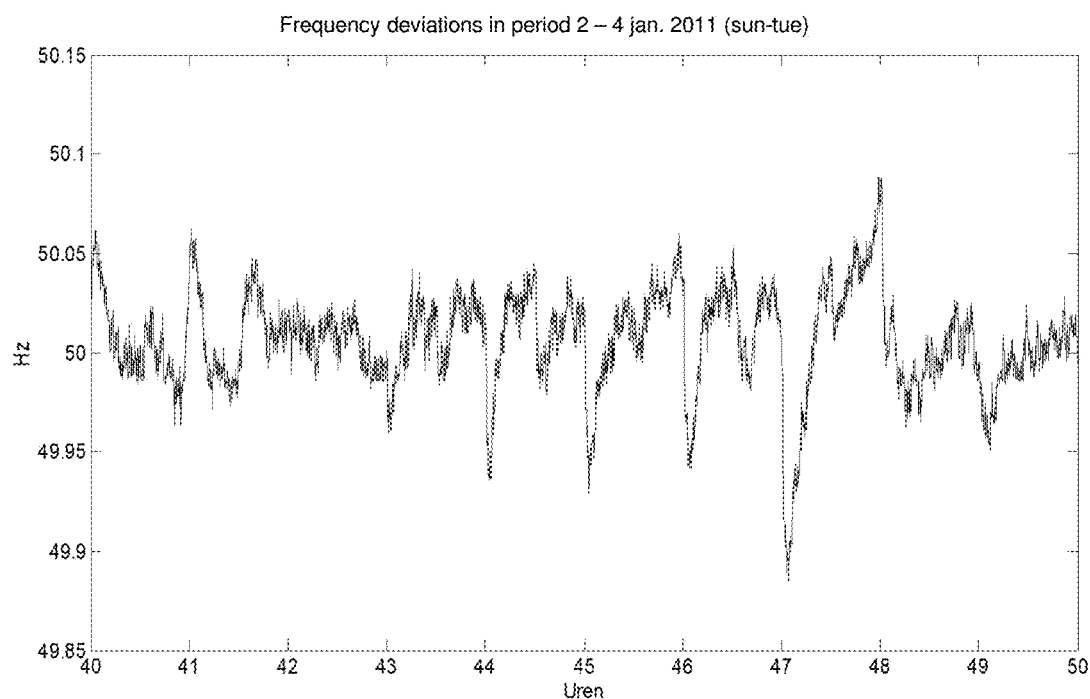

In the graph of FIG. 1, frequency deviations in a power grid are shown. Although the deviations are relative to a nominal value of 50 Hz, any other nominal value is also applicable, such as 60 Hz. In the graph it is evident that deviations occur at all times. However, in particular at hour crossings, frequency deviations occur. This graph exhibits the context of the problems facing the inventors of the present disclosure.

It is a well known fact that imbalances between sources, like energy generating facilities, and loads, formed by energy consumers, cause frequency deviations on the grid, like the one shown in FIG. 1. In FIG. 1, it is clearly shown that imbalances in the grid between supply and load at hour crossings cause normally greater deviations of the frequency relative to a desired stable frequency of for example 50 or 60 Hz, but at other times than at hour crossings quite considerable deviations may also occur.

According to the present disclosure, when a frequency deviation or excursion exceeds a threshold, energy is deployed from storage, such as a flywheel or battery. A flywheel is a preferred embodiment according to the present disclosure, because flywheels exhibit no or hardly any degradations over time. The flywheel is made to charge with energy from the grid or release energy therefrom into the grid, as frequency excursions occur.

A system 1, embodying a also a method according to the present disclosure, in an extremely simplified form, comprises a frequency monitor 3, connected to a grid 2, a controller 4 acting on a switch 6, dependent on frequency behaviour on the grid 2 as detected by the frequency monitor 3, to selectively connect energy storage 5 to the grid for storing energy from the grid in the storage 5 or deploying energy from the storage 5 into the grid 2, thereby effecting suppression of frequency excursions as depicted in FIG. 1.

The control 4 may compare instantaneous frequency values with a threshold, for example a 50 mHz threshold relative to the desired stable frequency of for example 50 or 60 Hz, to determine when to connect the storage 5 to the grid 2.

An advantage of storage 5 over prior art primary control and secondary control is that storage can respond within a matter of milliseconds and can therefore be deployed at any given time. Timing is of importance, as the available power from a storage is limited. Instantaneous deployment of a storage has the advantage that the primary (and secondary) controls may be deployed to a much lesser extent or even not at all, thus reserving or conserving the primary and secondary controls for true calamities, emergencies and the like. It is not excluded that the primary and even secondary controls are deployed, for instance to combat larger frequency deviations or deviations that persist for longer periods of time, which the storage cannot combat alone. Such occurrences should therefore be considered emergencies in the sense that the primary and secondary controls are justly deployed.

Figure 3:
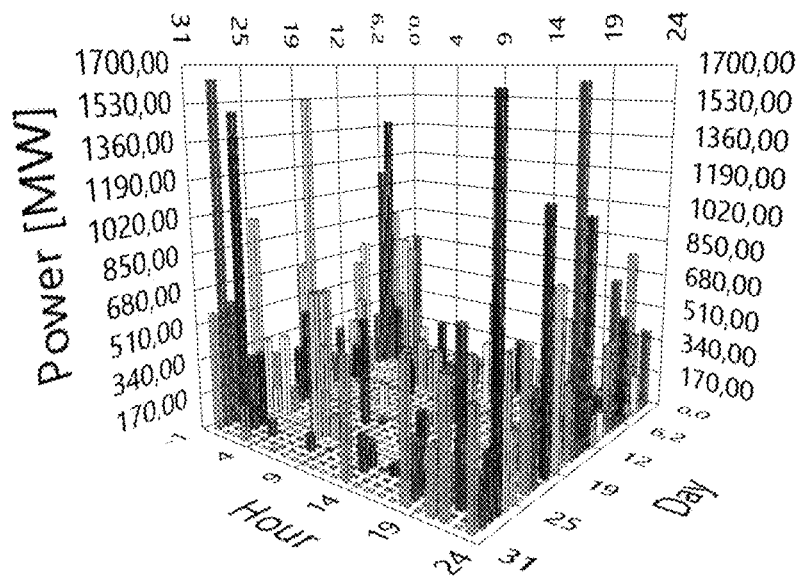
Figure 4:
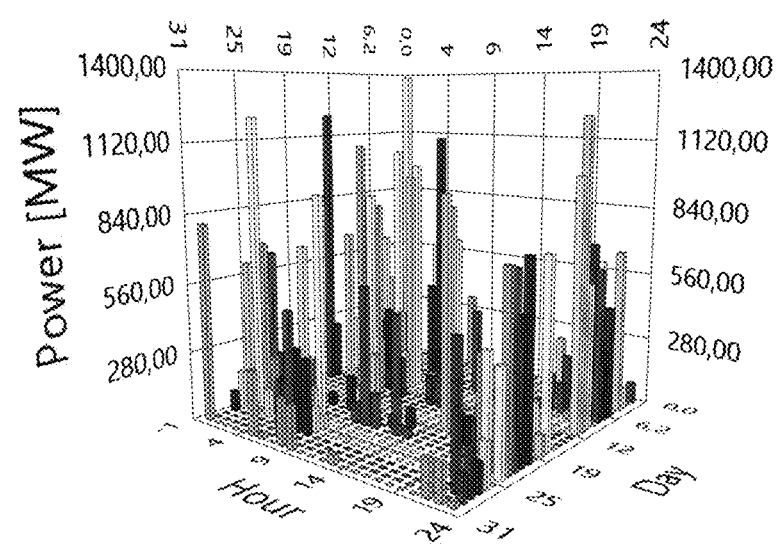

FIGS. 3 and 4 show statistical analysis of frequency behaviour on the grid 2. FIG. 3 shows negative deviations below 49.95 Hz, FIG. 4 shows positive deviations above 50.05 Hz.

The amount of storage required in the European situation is determined through a statistical analysis in terms of power of the same data on which FIGS. 3 and 4 are based. A bigger data set can be employed, than for one month as in FIGS. 3 and 4, for example for an entire year or more than one year. The threshold frequency is set at 50 mHz after which the amount of peaks are determined that surpass this threshold, which results in the graphs of FIGS. 3 and 4. Also, the duration of the peaks and the amount of power involved was determined. From the same data sets resulting in the graphs of FIGS. 3 and 4 it has been deduced that the maximum amount of power needed to suppress the frequency deviations is 1638 MW, on day 30, hour 0 and day 15, hour 23 (negative frequency deviation of FIG. 3). A broader analysis has revealed that a power to energy of 1638 MW/200 MWh is required for full suppression of all peaks.

Figure 5:
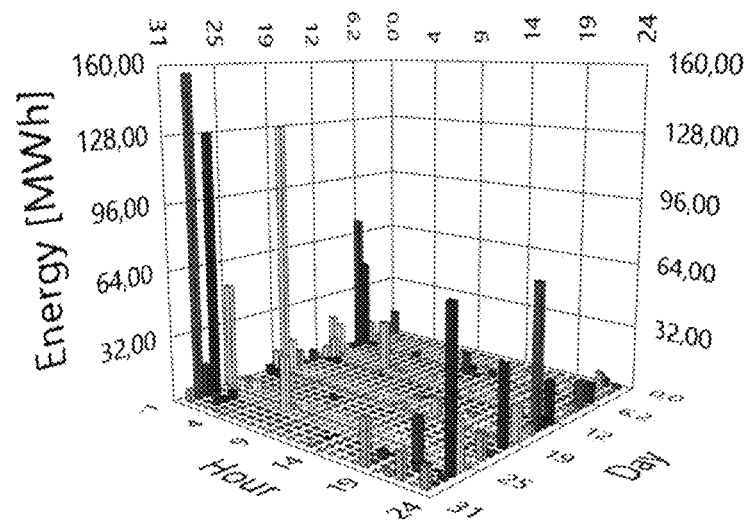
Figure 6:
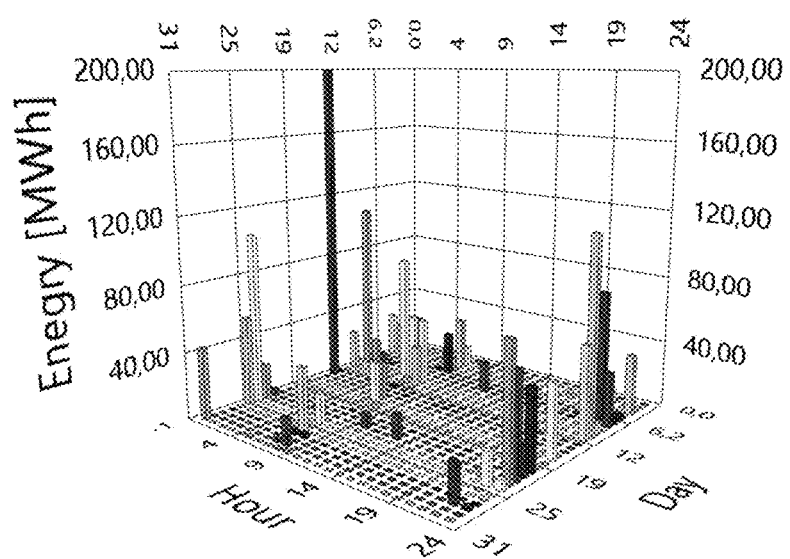
Figure 7:
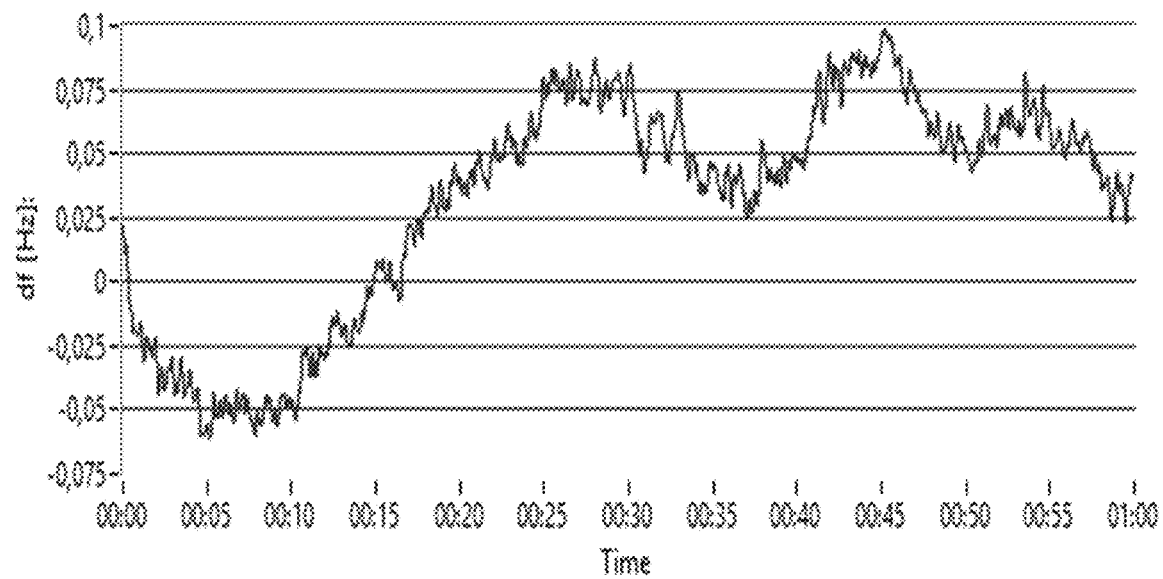

FIGS. 5 and 6 exemplify graphs indicating amounts of energy needed to suppress frequency deviations to below 50 mHz. A maximum of 200 MWh is detectable on day 14, hour 0 (positive frequency deviation of FIG. 4). Research and investigations have revealed that this 200 MWh peak is at three individual peaks above 50 mHz, without recuperation time cause the big energy requirement not found on other days, see FIG. 7.

Figure 8:
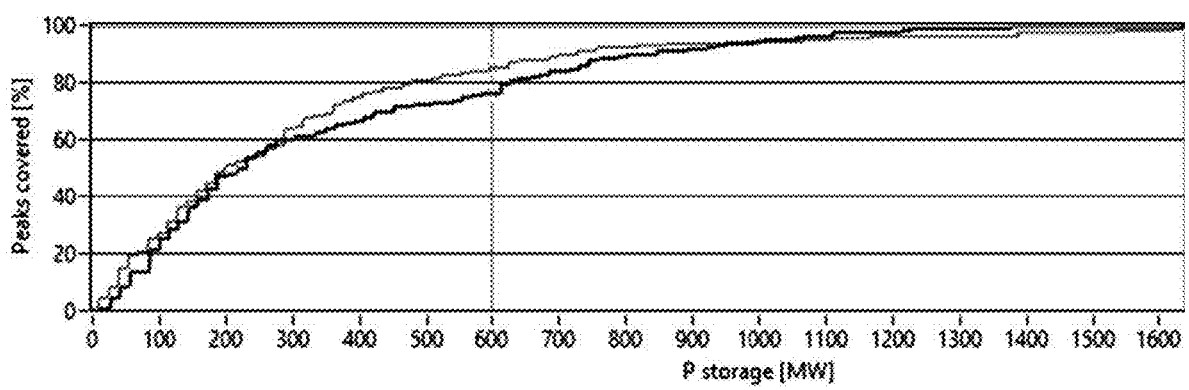

Analysis of the coverage of peaks, exhibited in FIG. 8, reduced with up to a maximum of 1638 MW/200 MWh storage shows that 80% of peaks are already covered with 600 MW/73 MWh (ratio 0.12).

Figure 9:
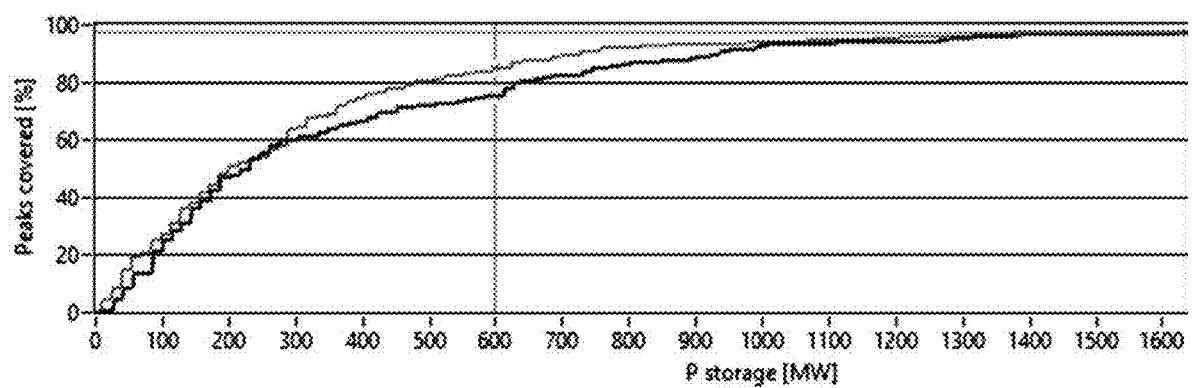

Optimizing the ratio allows it to be reduced to 0.06 and still cover 80% of peaks (i.e. 85% of positive peaks and 75% of negative peaks), as shown in FIG. 9. Further reduction of the ratio will also reduce the coverage.

In conclusion: In order to suppress all peaks to a threshold value of 50 mHz, a total amount of 1638 MW/73 MWh or even more than 73 MWh needs to be installed in Europe. This may be considered impracticable. Optimization of the power to energy ratio shows that by reducing the amount of installed storage capacity to 600 MW/36 MWh, it is still capable to reduce 80% of all peaks towards 50 mHz threshold. Remaining peaks can be considered true emergencies for which the primary and secondary controls may be allowed to kick in. By adjusting the threshold level at the peaks that exceed this 80%, it's possible to further maximise the effect of storage deployment.

Herein after, modes will be discussed for deployment of the storage.

Figure 2:
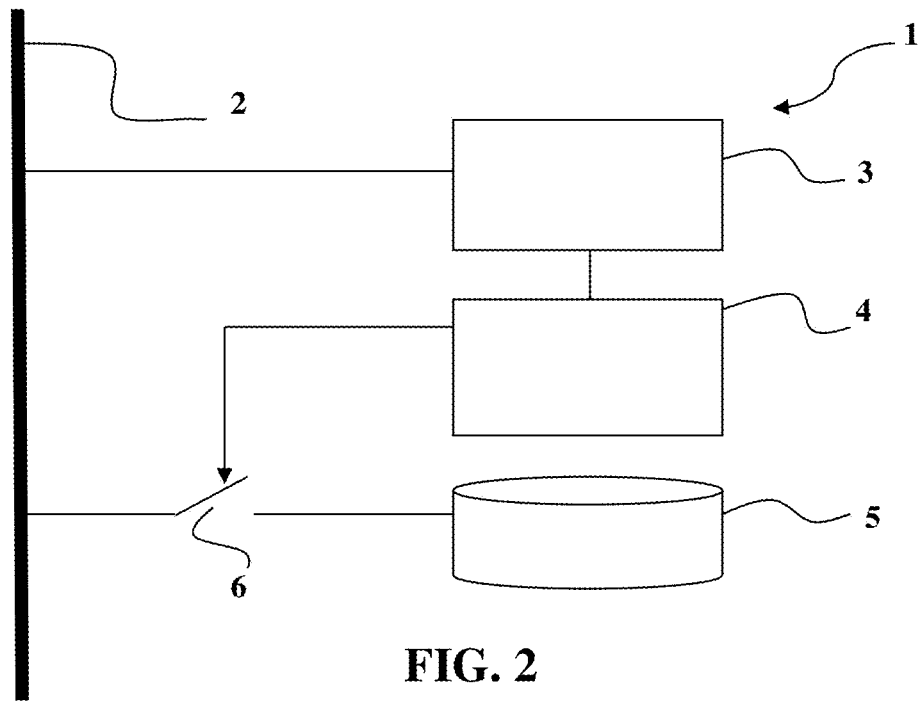

In a first mode, not covered in the scope of protection of the present disclosure according to in particular the appended independent method and system claims, the control in FIG. 2 may analyse changes in frequency on the grid to decide on deployment of the storage when any change relative to a desired value of the frequency occurs. Such a mode, that can be designated as proportional to changes in the frequency (df) acts continuously on the grid and reacts at any frequency deviation. As an advantage, frequency variations are continuously dampened. As a disadvantage, it has been determined, that storage in fact has a marginal effect on the greatest peaks during hourly crossings and the lack of optimal storage control. This results in longer periods where storage is either completely full or empty, and thus in fact idle and ineffective. Results of simulations and tests have yielded—for a storage configuration of 600 MW/36 MWh—a reduction of df peaks with this algorithm through-out a day is 5.9% (average hourly improvement) and a peak reduction of 7.6%. No reduction in the amount of deployed Primary Control power was determined.

In a second mode, herein after referred to as a 'threshold' algorithm, a df threshold is determined. When the frequency crosses the threshold value, storage is deployed to counteract proportionally to the deviation in order to suppress the frequency deviation. Below the df threshold the algorithm prepares the storage for the next peak by charging (or discharging) its capacity, preferably to a 50% level. This way the storage can react on both positive or negative df peaks. The rate at which the (dis)charging takes place can be set.

In principle, the threshold value can be dynamically adapted depending on the hour of the day. Statistics have shown that the largest peaks always occur on the same hour of the day. At these moments the threshold value can be set to 50 mHz or higher. At other moments during the day the threshold value may be lowered to 20 or 30 mHz.

Results of simulations and tests have yielded—for a storage configuration of 600 MW/36 MWh—a reduction of df peaks of 20.7% and throughout the simulated day of 9.0% (average hourly improvement). Moreover, using this algorithm, the amount of deployed Primary Control power is reduced by 29%. More in particular, deployed PCR without added storage controlled on the basis of the threshold: 1544 MW, deployed PCR with storage controlled based on threshold: 1096 MW; a reduction 448 MW.

Figure 10:
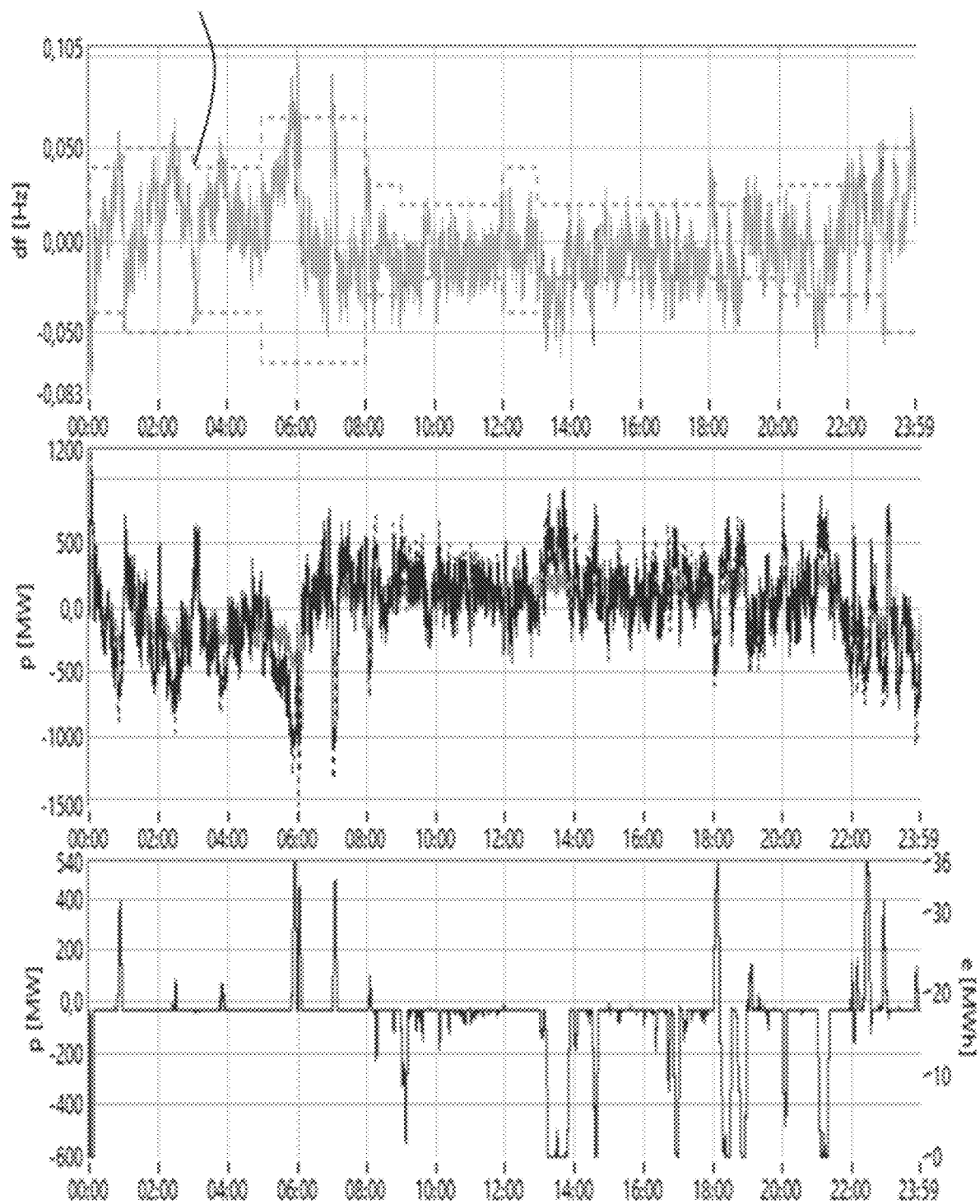

FIG. 10 exhibits in a dashed line 7 in the top graph of FIG. 10, an example of an hourly adjusted threshold. This adjustment may be based on an instantaneous response to frequency changes in the grid 2, or statistically based on historical data (see for example FIGS. 3-6).

Figure 11:
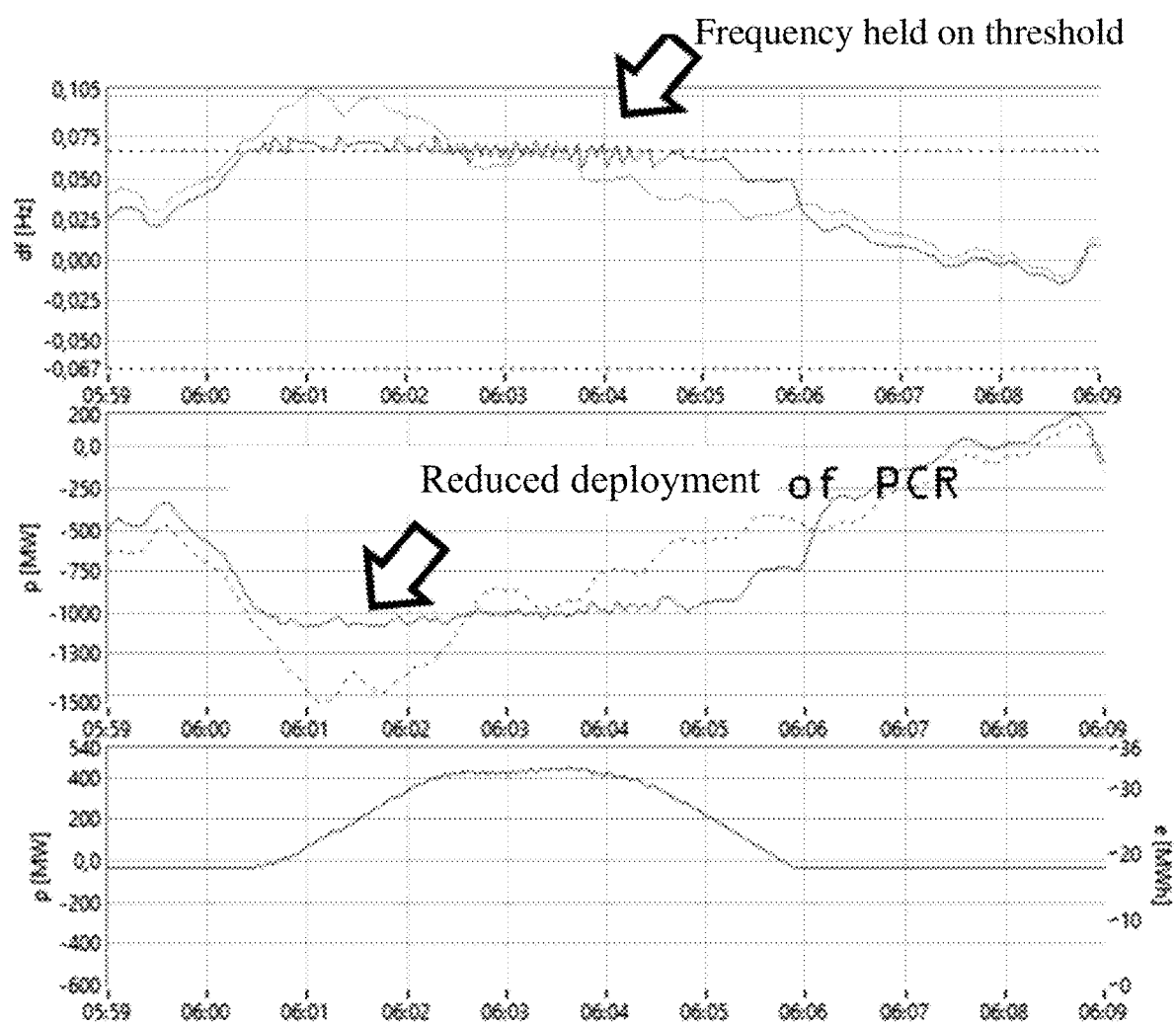

FIG. 11 shows the effect of this scheme on deployment of primary control (PCR), at a single hour crossing. The effects are extra-ordinary.

In summary, it is apparently possible with the principles of the present disclosure to build an algorithm that enables storage assets to effectively attack or at least counteract frequency excursions during hour crossings. The algorithm allows for small amounts of storage to be highly effective. We have determined highly satisfactory results with only 600 MW/36 MWh of storage capacity throughout Europe. With this storage capacity it has turned out to be possible to reduce the maximum frequency deviation with 20.7%. In doing so, the amount of deployed Primary Control Power was reduced by 448 MW. An important contribution to the effectiveness of storage deployment is considered to be provided by the fast response time thereof. In comparison: to get the same reduction of the frequency deviation with PCR, TSO's need to increase their standby reserve capacity with 73%. This is 2.200 MW on a European scale up to 5.200 MW.

Based on the tested algorithms, a comparison was performed between flywheel based technology and current state of art battery systems. The comparison of a flywheel (like the one disclosed in WO-2015/156.667), and batteries is based on the deployment of storage for The Netherlands only, thus of 4% of the above mentioned Europe wide required 600 MW being 24 MW. The required power to energy ratio is 16.7. Technically, this ratio favours a choice for a flywheel based system and method, since currently available battery technology cannot deliver such amount of power without de-rating very quickly. Therefore the amount of installed energy capacity has been set to 24 MWh in case of the batteries. The power-to-energy ratio is 1, which is well within the boundaries of a battery system. In the table of FIG. 12, a comparison is made between the flywheel system, lead acid battery and a li-ion battery system. The conclusion is self evident that the flywheel based system and method are technically and commercially preferable over current battery systems.

After the foregoing results, it has been proven experimentally that the flywheel based implementation of the method and system according to the present disclosure functions in accordance with calculations, predictions and modeling. The inventors of the present disclosure then went on to try to further optimize the method and system, wherein selected threshold values were fixed for every hourly crossing, and further improvements were investigated by making the algorithm more autonomous using df/dt.

Figure 13:
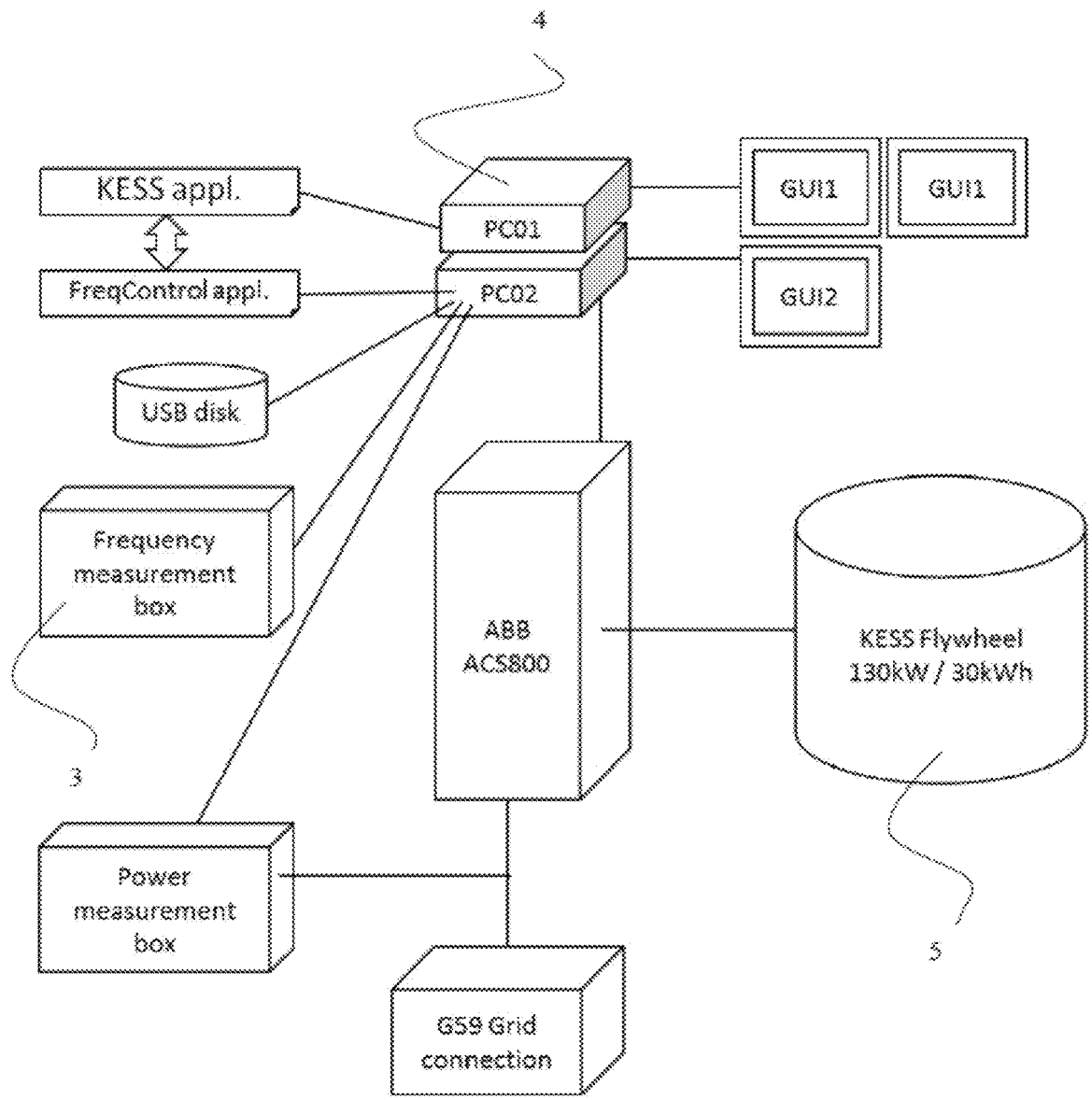

Both algorithms above (proportional and static threshold) were used in real-life to control the flywheel in a setup according to FIG. 13. Validation of the set-up proved that reliable measurements can be performed. The setup was tested and found reliable. Before the algorithms were put to the test, an overall performance test on the system setup was performed. The findings will be summed up.

System Response

The time between a frequency change and the system's follow-up action consists of the steps given below. The measured response time and the cause of the duration of the steps is broken down as follows.

Gated frequency measurement. In order to measure frequency with sufficient accuracy, the mains frequency must be sampled during multiple periods. (400 ms of sampling @ 2.5 GHz gives 1 mHz resolution)

Communication chain from LabVIEW PC via Compact Rio to drive (400 ms)

Reaction time to power setting update and ramp rate of drive (150 ms)

In the current setup, communication takes up most of the response time. This path can be shortened dramatically in a dedicated setup to almost neglectable timeframes.

Harmonics

A fast switching IGBT drive was chosen It creates a fairly clean sine and there are no occurrences of $3^{rd}$ or $5^{th}$ harmonics. Normally, these types of drive create higher harmonics but they are filtered efficiently in the setup of FIG. 13.

Phase Balance

Phase balance is another important power quality aspect, and like harmonics, it is fully determined by the drive. In the current setup, there were no significant degradations to the phase balance, and as a result, phase balance was within the measurement error of the Power Quality Analyser (PQA).

Degradation

For any energy storage medium, degradation as a function of time and usage is an important property. The effect of degradation on the storage functionality differs significantly between battery storage devices and flywheel storage devices. For example, the most important degradation metric for battery systems is capacity fade as a function of time and number of charge-discharge cycles. Flywheels do not lose any power- or storage capacity during their lifetime.

In total 32 test runs of one hour have been defined based on one frequency profile containing 'high' and 'low' frequency deviations in practice and/or based on data sets acquired by grid monitoring beforehand, as well as designed frequency slopes consisting of clean up and down-ramps.

The variations in test runs were due to variations in algorithm parameters, power-to-energy ratios and RPM-levels.

Figure 14:
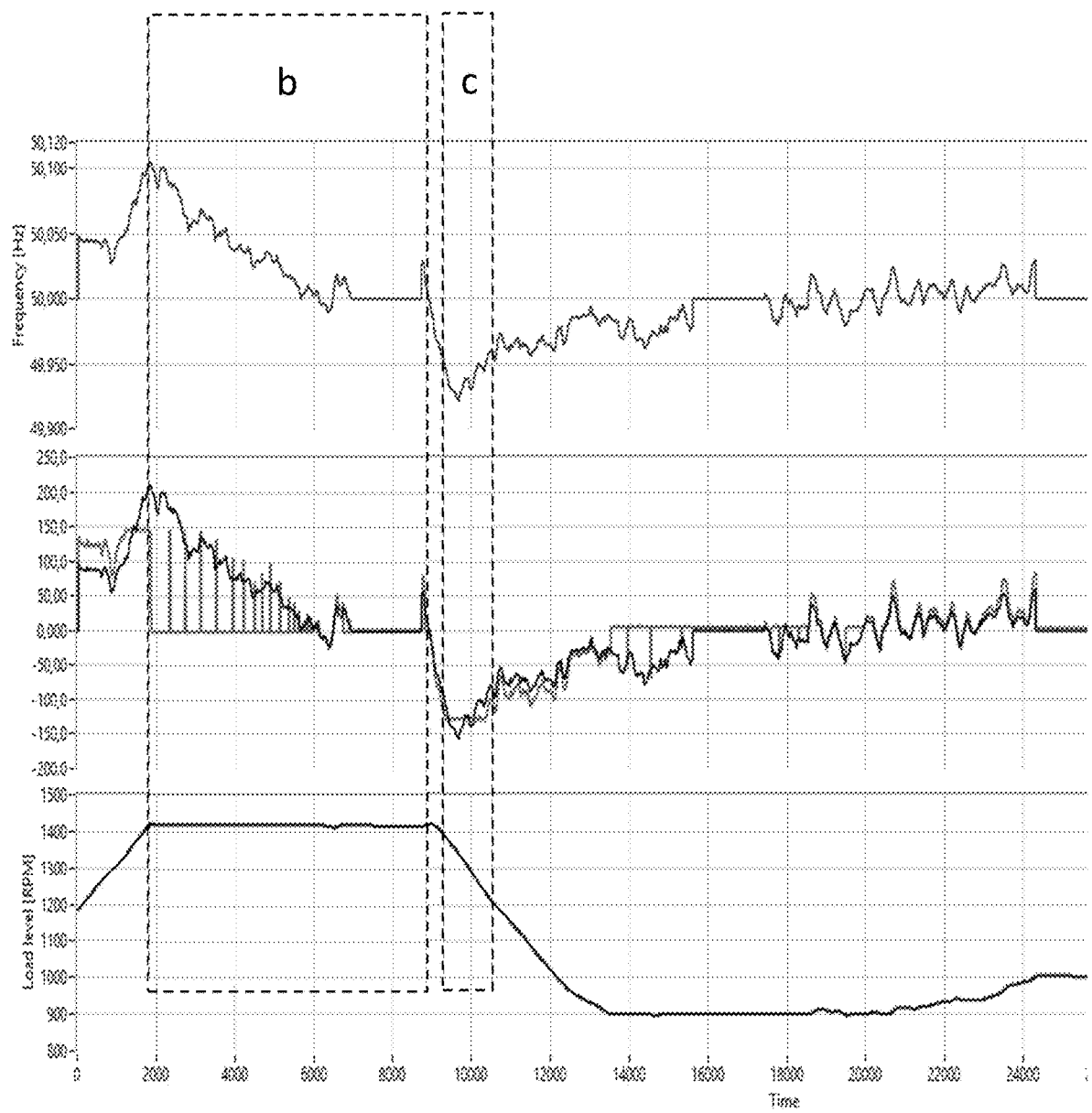

The results of testing the proportional algorithm are shown in FIG. 14. The Proportional algorithm behaves as was shown predicted and expected from prior simulations. When looking at zone a in FIG. 14 it is self evident that storage is following the requested power output perfectly. The required power line in the middle graph is visualised as a proportional value derived from the frequency (not in kW). The measured power line in the same graph is visualised as actual measured power (in kW). At the end of zone a, the limitations of a proportional algorithm are visible. Considering the fact that the frequency is never stable at 50 Hz, this algorithm continuously requires an amount of energy.

Once the storage capacity is fully used, the algorithm will gradually restore to its starting level of 50% of its load level. Frictional losses that free up storage capacity are immediately filled up by the algorithm, as shown in zone b. At the end of zone b the frequency starts to decline below 50 Hz and storage is fully prepared to deploy the countermeasures.

Figure 15:
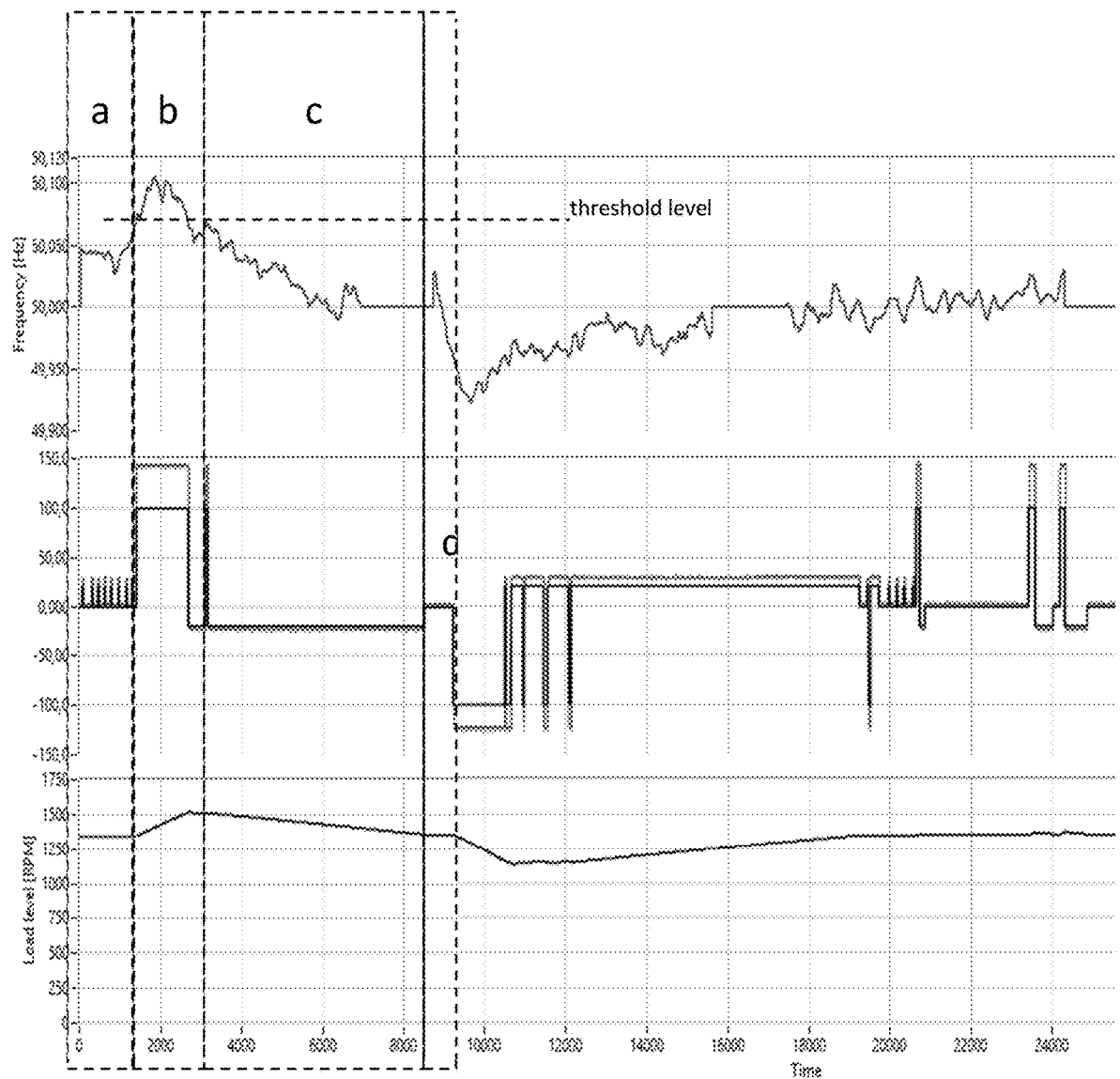

FIG. 15 exemplifies test results for the static threshold level based algorithm. The static threshold algorithm also performs as previously simulated. Again, the required power line in the middle graph is shown as a proportional value derived from the frequency (not in kW). The measured power line in the same graph is shown as actual measured power (in kW).

The second graph shows the amount of actual deployed power vs. requested power and the flywheel is able to follow the algorithm continuously during the complete hour of testing. The scale of the storage depletion graph is emphasized here. The storage capacity is completely used in this algorithm as well. The difference with the proportional algorithm is that the amount of storage was the same for both algorithms, but is only sufficient for this static threshold algorithm.

Conclusions of the testing are that the flywheel is well capable of delivering the power required by the algorithms, and that the reaction speed of the flywheel is within 1 s (excl. delay caused by communication step within the test set-up). The observed behaviour of the algorithms equals the expected behaviour and the findings of the previously performed simulation runs.

As indicated above, further simulations and tests were performed. Goal of this study is to come to an enhancement of autonomy and performance of the static threshold algorithm through df/dt analysis. A data set of at least approximately one year was used to analyse the behaviour of the grid frequency (mainly around the hourly crossings).

Figure 16:
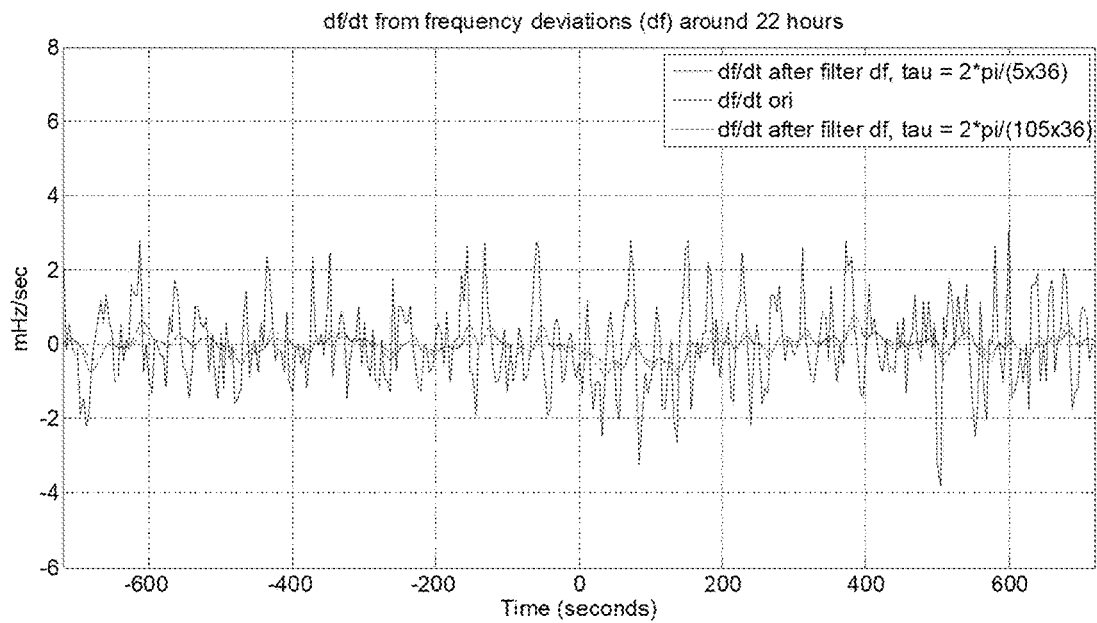

A prior analysis of frequency behaviour of the grid revealed a correlation between peak height and df/dt to some extent. FIG. 16 shows df/dt at a particular hour crossing. However, the detected correlation turned out to be less suitable for predictive storage deployment without taking certain precautionary measures. First of all, the mathematic approach of finding correlation led to the loss of some extremities in predicted values. Secondly, the predictability could only be found once a 36 sec. filter was applied, which was not in favour of the algorithm effectiveness, relying on speed of intervention.

In the chosen approach to create an improved algorithm with the use of the actual frequency profile, a methodology was created that allows reference values to be generated, to which the actual data will be compared continuously. This set of reference values can be based on an analysis of a dataset that adjusts over time. thus, instantaneous frequency behaviour can be compared with profiles to predict a forthcoming frequency deviation and prepare an associated threshold to be employed.

Figure 17:
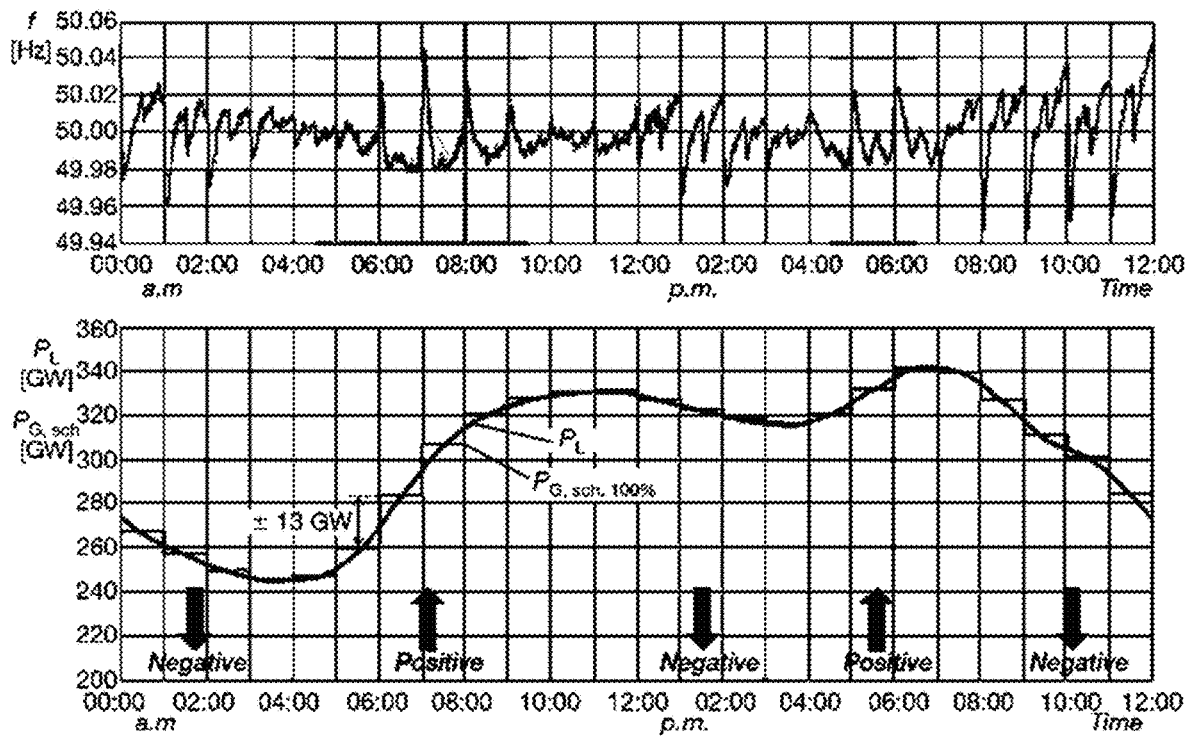
FIG. 17 shows an exemplary pattern deducible from data of frequency deviations.

Hourly crossing profiles differ for every hour of the day. This matches the theory on the origin of these particular frequency deviations as a result of scheduled/stepwise adjustment of generation and import profiles to the daily power requirement (Weißbach). The direction of the frequency deviations during the day is related to the daily consumption and production patterns and therefore predictable. FIG. 17 shows an exemplary pattern deducible from data of frequency deviations.

Looking deeper into the data of FIG. 17, the maximum height of the peaks vary every day of the week, but again in a repetitive pattern. In FIG. 18, the average week pattern of an entire exemplary dataset of 10 months is shown. The repetitive patterns of the individual hour crossings divided over the week results in a further analysis of 168 individual hour-crossing profiles (every hour of the day times every day of the week).

First if all, the individual hour crossings for each day of the provided dataset were compared. Grouping the frequency profiles by 'hour' shows that peak heights (and direction) have similar values per hour (FIG. 19). Compensating the base frequency level just before the hourly crossing shows the similarities in height and direction even more (FIG. 20).

Based on these facts, a set of reference values of peak (or dip) height and df/dt profile is created, that can be combined with actual df/dt values, instantaneously measured. Together with the information on storage level this allows determination of a new threshold value for each individual hourly crossing.

It has turned out to be possible to use a characteristic shape of an hourly crossing as depicted in FIG. 21. To this end, the following considerations need to be taken into account.

Values for b and e can be positive or negative. Values for a until f are determined from the data set after normalising the profile to a start frequency of 50,000 Hz. Mean and standard deviation values are calculated for values a until f. At phase 1 storage levels will slowly be prepared to its optimum. At phase 2 the optimum threshold point will be determined and set by combining the actual frequency with the reference profile.

Since every new hour crossing is evaluated through a number of parameters, these momentaneous analysis results may be added to the set of reference values, thus creating a continuously refreshing dataset that can be implemented that can provide a 'blueprint' to be used for future hourly crossings. This way the algorithm may always take seasonal or other long-term changes into account.

In summary, this blueprint will give us a continuously updated reference profile for every hourly crossing to come. It will provide predictive data on the direction of the frequency to determine the optimal storage level; and also a predicted df/dt profile to determine—together with the actual frequency signal—where the initial threshold level must be set.

Once the hourly crossing commences and storage is deployed, the threshold level will be dynamically adjusted every second by comparing the actual df/dt value with the actual storage level. On this comparison, the algorithm will make a decision whether storage deployment must continue based on the same threshold level or if the threshold level need to be fine-tuned.

In FIG. 22, on the right, the dynamic threshold function is shown in action through the line 8 in the top graph, in comparison with the static algorithm to the left. In the static threshold based algorithm the threshold was set to 0.07 Hz, relative to the desired stable frequency of 50 or 60 Hz. In the dynamic process, an initial value of he threshold was set at 30:00 at its starting value by the algorithm. From this point on, the algorithm increases the threshold to move up gradually until the frequency deviation is mitigated. Results: in comparison with the purely static threshold based algorithm, the presently described dynamic algorithm is 54% more effective on the peak reduction, both in terms of frequency and of PCR (middle graph).

The graphs in FIG. 22 demonstrate the effect of the improved algorithm on one particular hourly crossing. The simulation results of the algorithm on a large dataset provided gives the results as displayed in the tables below.

TABLE 1

Static threshold:

| Impact on frequency | week | sun | mon | tue | wed | thu | fri | sat | |
|---|---|---|---|---|---|---|---|---|---|
| df_max_no_storage: | 0.197 | 0.157 | 0.172 | 0.174 | 0.164 | 0.188 | 0.138 | 0.149 | Hz |
| df_max_with_storage: | 0.183 | 0.157 | 0.132 | 0.183 | 0.148 | 0.164 | 0.132 | 0.145 | Hz |
| df_max_pos | 0.078 | 0.063 | 0.070 | 0.078 | 0.073 | 0.070 | 0.053 | 0.064 | Hz |
| df_min_neg | −0.105 | −0.093 | −0.061 | −0.105 | −0.075 | −0.094 | −0.080 | −0.081 | Hz |
| improvement on df: | 7.1 | 0.4 | 23.7 | −5.5 | 9.9 | 12.7 | 4.5 | 2.3 | % |

TABLE 2

Dynamic threshold with fine-tuning:

| Impact on frequency | week | sun | mon | tue | wed | thu | fri | sat | |
|---|---|---|---|---|---|---|---|---|---|
| df_max_no_storage: | 0.197 | 0.157 | 0.172 | 0.174 | 0.164 | 0.188 | 0.138 | 0.149 | Hz |
| df_max_with_storage: | 0.165 | 0.135 | 0.134 | 0.165 | 0.140 | 0.143 | 0.124 | 0.140 | Hz |
| df_max_pos | 0.078 | 0.050 | 0.064 | 0.078 | 0.072 | 0.061 | 0.053 | 0.064 | Hz |
| df_min_neg | −0.087 | −0.085 | −0.070 | −0.087 | −0.068 | −0.081 | −0.072 | −0.076 | Hz |
| improvement on df: | 16.3 | 14.3 | 22.5 | 5.0 | 14.9 | 24.2 | 10.3 | 5.7 | % |

Evidently, a marked improvement has been realized, both in performance and consistency compared to the static threshold based algorithm, with a better fit on all days of the week.

Analysis of frequency data, to arrive at a dynamic threshold setting provides a significant improvement in both autonomy and performance, using a combination of automated analysis of running frequency logs, and using predictions per 'day of the week' and 'hour of the day' for optimal load management of storage, as well as threshold optimisation through live matching of predicted df/dt profiles with actual measured df/dt and available storage levels.

Herein below an explanation is provided in more detail on the determination of the reference values, that help predict future frequency profiles of hourly crossings. The slope (df/dt) of the frequency deviations within the hourly crossing originate from the fact that the grid frequency depicts the balance between the gradual variation in energy consumption and the stepwise adaption of the energy generation and import mixes, as shown in FIG. 23.

The generic shape of FIGS. 21 and 24 is used to characterize every hourly crossing using the following considerations. Values for b and e can be positive or negative. Values for a until f are determined from the data set after normalising the profile to a start frequency of 50,000 Hz. Mean and standard deviation values are calculated for values a through to f.

A part of the hourly crossing show a normal distribution of the data points; the rest appears to contain several normal distributions. As for the peak direction, we can use this information to determine the appropriate load level and prepare the storage in advance. As soon as the hourly crossing has started changing the load level is not possible (due to the lack of time).

FIG. 25 exhibits a first example of an approach to an hourly crossing, in which all observations are negative. Based on this intelligence, it is possible to anticipate on a negative frequency deviation and prepare the storage load level for 100%.

FIG. 26 exhibits a second example of an hour crossing, in which observations are for the most part in the positive area; a small part is in the negative area. Because the observations in the negative area have small amplitudes it is possible to choose between two options: anticipate on positive frequency deviations only and prepare the storage for 100%, or anticipate on positive frequency deviations and prepare the storage for e.g. 80%, leaving 20% 'room' for small negative deviations. This adaptability provides an extremely enhanced improvement to suppress frequency deviations.

FIG. 27 exhibits yet another situation in which the observations are evenly distributed. The algorithm then prepares a storage level of 50%, which seems adequate and appropriate as the deviation could go either way.

Immediately after the full hour a threshold level needs to be determined for the deployment of storage. Based on the continuously refreshing analysis an optimal threshold value is available for every hour of the week. By measuring the frequency slope, as shown in FIG. 28, immediately after the full hour, the threshold level can be fine-tuned to match the available storage capacity on the energy requirement to suppress the frequency deviation.

Based on the continuously refreshing analysis the peak direction can be predicted and used for an optimal preparation of the load level of the storage during the time before the hourly crossing. FIG. 29 shows an embodiment in which no load management (no dynamic adaptation of the threshold) is applied: after every deployment a 50% load level is restored. In contrast, FIG. 30 exhibits optimal preparation of the load level, through dynamic adaptation of the threshold as described above, thereby making available a full storage capacity in crucial moments. The full storage capacity is then available to put on or extract energy from the grid, to enable suppression of frequency deviations. The result constitutes an improvement of −100% on df reduction with same storage capacity.

Within the framework of anticipation, full anticipation and a variant constituting partial anticipation were compared. In proportional anticipation, the algorithm sets a response to frequency deviations from the storage, in which the response is proportional to the deviations, whereas in full anticipation, the response from the storage is to insert or extract its full capacity.

TABLE 3

| | proportional anticipation | | | | | | | | |
|---|---|---|---|---|---|---|---|---|---|
| Impact on frequency | week | sun | mon | tue | wed | thu | fri | sat | |
| df_max_no_storage: | 0.197 | 0.157 | 0.172 | 0.174 | 0.164 | 0.188 | 0.138 | 0.149 | Hz |
| df_max_with_storage: | 0.165 | 0.134 | 0.134 | 0.165 | 0.140 | 0.144 | 0.124 | 0.140 | Hz |
| df_max_pos | 0.078 | 0.050 | 0.064 | 0.078 | 0.072 | 0.062 | 0.053 | 0.064 | Hz |
| df_min_neg | −0.087 | −0.084 | −0.070 | −0.087 | −0.068 | −0.081 | −0.072 | −0.076 | Hz |
| improvement on df: | 16.3 | 14.8 | 22.5 | 5.0 | 14.6 | 23.7 | 10.3 | 5.7 | % |

When comparing tables 2 and 3 above, it appears that there are only marginal differences, and overall performance is practically equal. However, another important conclusion was arrived at, that in cases where the peak direction prediction was incorrect, an impact thereof turned out to be marginal. This is considered to be a result of the adaptive setting of the threshold, in combination with information about the charge of the storage.

Right after the hour crossing (beginning of phase 5) the predicted peak height and time are used to calculate a threshold level that will allow the storage to mitigate the predicted peak completely. The actual frequency level is measured in phase 2 of the hourly crossing, and used to translate the value to the prediction. The actual capacity of the storage must match the surface the triangle in FIG. 28, thus fixing the threshold level in the equation. The predicted threshold values will be fine-tuned during the hourly crossing comparing measurements of actual storage level and actual df/dt.

It is noted here that the scope of protection for the present disclosure is by no means limited to the actually disclosed and potentially preferred embodiments, but that many alternative and additional features and aspects are possible within the framework of the present disclosure and of the appended independent and dependent claims. As an alternative for storage, the invention could be implemented using a very quickly deployable supply or generator, which can be deployed more quickly than supplies currently available. As a further example, a reserve generator may be coupled with a flywheel for replenishing more quickly the charge of the flywheel than from the grid after deployment and having been drained.

The invention claimed is:

1. A method of suppressing frequency deviations in a power grid relative to a desired frequency behavior, in particular at hour crossings, wherein an energy storage is connected to the grid, and wherein the method comprises:
   monitoring frequency in the grid relative to the desired frequency behavior, to determine detected frequency deviations;
   comparing detected frequency deviations with a threshold;
   deploying the storage to charge therein energy from the grid or to discharge energy therefrom into the grid, if detected frequency deviations exceed the threshold; and
   setting a variable threshold,
   wherein the method further comprises:
      statistically determining, from historical behavior data, when in the course of a time period larger and smaller frequency deviations statistically occur, wherein predicted frequency deviations are associated with predetermined future times-of-day, and wherein said time period is at least one from a group, comprising: a day, a week, a month, and a year beforehand;
      when approaching a time-of-day at which a larger frequency deviation is statistically expected to occur, setting at least one first higher threshold to be employed, wherein the at least one first higher threshold is set in proportion to the expected larger frequency deviation; and
      when approaching a time-of-day at which a smaller frequency deviation is statistically expected to occur, setting a second lower threshold to be employed, wherein the second lower threshold is set in proportion to the anticipated smaller frequency deviation.

2. The method according to claim 1, further comprising charging energy into the storage from the grid or discharging energy from the storage into the grid at a maximum rate associated with the storage.

3. The method according to claim 1, further comprising:
   from the historical behavior data, determining an amount of power (P in W) needed to suppress a predetermined portion of frequency deviations in the grid to the threshold;
   from the historical behavior data, determining an amount of energy (E in Wh) needed to suppress the predetermined portion of frequency deviations in the grid to the threshold; and
   configuring the storage to exhibit a ratio of storage energy to storage power at most approximately equal to a ratio of the determined amount of energy to the determined amount of power.

4. The method according to claim 3, wherein configuring the storage further comprises lowering either or both of the storage energy and the storage power to at most 70%.

5. The method according to claim 3, further comprising lowering the ratio of storage energy to storage power to at most 75% of the ratio of the determined amount of energy to the determined amount of power.

6. The method according to claim 1, further comprising setting a fixed threshold.

7. The method according to claim 1, further comprising:
   statistically determining, from the historical behavior data, at least two frequency profiles;
   determining at least one threshold associated with each of the frequency profiles;
   monitoring development of the frequency over time;
   comparing the monitored development of the frequency with the profiles;
   selecting a profile most resembling the development of the frequency over time, selecting the associated threshold; and
   employing the selected associated threshold in the deployment of the energy storage.

8. The method according to claim 7, wherein monitoring development of the frequency deviation comprises measuring a frequency slope in time (df/dt), and employing the selected associated threshold is performed in correspondence with available storage capacity and an expected energy requirement for suppression of the frequency deviation.

9. The method according to claim 1, further comprising:
   if, during deployment of the storage to charge therein energy from the grid or to discharge energy therefrom into the grid, it is detected that the frequency deviations continue to exceed the threshold, raising the threshold.

10. The method according to claim 9, wherein raising the threshold comprises increasing the threshold in a manner from a group, comprising stepwise increase, linear increase, and asymptotic increase.

11. The method according to claim 1, wherein the storage comprises either or both of at least one battery and at least one flywheel.

12. The method according to claim 1, further comprising deploying the storage to charge therein energy from the grid or to discharge energy therefrom into the grid only in time proximity of hour crossings.

13. The method according to claim 1, further comprising charging or discharging the storage, when detected frequency deviations are below the threshold.

14. The method according to claim 13, further comprising setting a rate of charging or discharging the storage.

15. The method according to claim 13, comprising charging or discharging the storage to a portion of full storage capacity.

16. The method according to claim 15, further comprising charging or discharging the storage to between half and full storage capacity, where at a subsequent instance of the frequency deviation exceeding the threshold a discharge of the storage is anticipated to be needed, or charging or discharging the storage to more than no charge and half a full storage capacity, where at a subsequent instance of the frequency deviation exceeding the threshold a charge of the storage is anticipated to be needed.

17. The method according to claim 3, wherein configuring the storage further comprises lowering either or both of the storage energy and the storage power to at most 55%.

18. The method according to claim 3, wherein configuring the storage further comprises lowering either or both of the storage energy and the storage power to at most 33%.

19. The method according to claim 3, wherein configuring the storage further comprises lowering either or both of the storage energy and the storage power approximately a third of either or both of the determined energy and the determined power.

20. The method according to claim 3, further comprising lowering the ratio of storage energy to storage power to approximately 50% of the ratio of the determined amount of energy to the determined amount of power.

21. The method according to claim 1, wherein the historical behavior data is historical behavior data of the grid.

22. A system, comprising:
a connection to a power grid;
an energy storage selectively connectable to the connection;
a frequency monitor connected to the connection; and
a control configured to selectively connect the energy storage to the connection based on a comparison of detected frequency deviations with a threshold;
the control is further configured to deploy the energy storage, if detected frequency deviations exceed the threshold, to charge therein energy from the grid or to discharge energy therefrom into the grid, and to set a variable threshold,
wherein the control is further configured to:
when approaching a time-of-day at which a larger frequency deviation is statistically expected to occur, set at least one first higher threshold to be employed, wherein the at least one first higher threshold is set in proportion to the anticipated larger frequency deviation; and
when approaching a time-of-day at which a smaller frequency deviation is statistically expected to occur, set a second lower threshold to be employed, wherein the lower threshold is set in proportion to the anticipated smaller frequency deviation;
wherein said larger and smaller frequency deviations are associated with a time-of-day; and
wherein predetermined future times-of-day at which the larger frequency deviation is statistically predicted to occur and predetermined future times-of-day at which the smaller frequency deviation is statistically predicted to occur, are statistically determined, based on a historical behavior data set by determining when in the course of a time period they are predicted to occur, wherein said time period is at least one from a group, comprising: a day, a week, a month, and a year beforehand.

23. The method according to claim 22, wherein the historical behavior data set is a historical behavior data set of the grid.

* * * * *